US008663020B2

(12) United States Patent
Murakami

(10) Patent No.: US 8,663,020 B2
(45) Date of Patent: Mar. 4, 2014

(54) SHAFT

(75) Inventor: Satoshi Murakami, Nishio (JP)

(73) Assignee: Aisin AW Co., Ltd., Aichi-ken (JP)

(*) Notice: Subject to any disclaimer, the term of this patent is extended or adjusted under 35 U.S.C. 154(b) by 0 days.

(21) Appl. No.: 13/404,713

(22) Filed: Feb. 24, 2012

(65) Prior Publication Data

US 2012/0220379 A1     Aug. 30, 2012

(30) Foreign Application Priority Data

Feb. 28, 2011    (JP) ................................ 2011-041169

(51) Int. Cl.
*F16C 3/02*      (2006.01)

(52) U.S. Cl.
USPC .............................................. 464/7; 464/183

(58) Field of Classification Search
USPC ......................... 464/7, 183; 138/89.4; 310/61
See application file for complete search history.

(56) References Cited

U.S. PATENT DOCUMENTS

| 3,188,833 | A | * | 6/1965 | Robinson Russell I | ..... 310/61 X |
| 4,820,241 | A | * | 4/1989 | Nakamura | ..... 464/183 |
| 5,119,905 | A | * | 6/1992 | Murray | ..... 464/7 X |
| 7,971,694 | B2 | * | 7/2011 | Beattie | ..... 464/183 X |
| 8,161,619 | B2 | * | 4/2012 | Wanthal | ..... 464/183 X |

FOREIGN PATENT DOCUMENTS

| JP | 2003-199292 A | 7/2003 |
| JP | 2007-020337 A | 1/2007 |
| JP | 2010-142090 A | 6/2010 |

OTHER PUBLICATIONS

International Search Report for corresponding International Patent Application No. PCT/JP2012/000808 mailed Apr. 10, 2012.

* cited by examiner

*Primary Examiner* — Gregory Binda
(74) *Attorney, Agent, or Firm* — Sughrue Mion, PLLC

(57) ABSTRACT

A shaft, including an outer peripheral surface; an inner peripheral surface; an oil flow passage that is formed in the shaft and is defined by the inner peripheral surface; a large inner-diameter portion having a first inner diameter; a small inner-diameter portion adjoining the large inner-diameter portion in one direction along an axial direction of the shaft, and having a second inner diameter smaller than the first inner diameter; and a through hole extending from an inner peripheral surface of the large inner-diameter portion to the outer peripheral surface of the shaft. The small inner-diameter portion is formed by bending radially inward an extending portion, which extends in the one direction from the large inner-diameter portion.

6 Claims, 5 Drawing Sheets

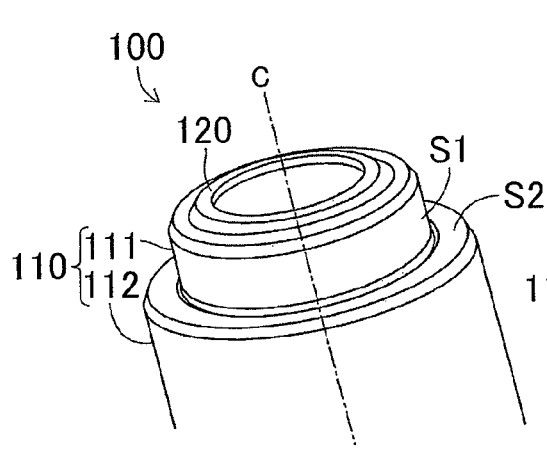
F I G. 3A
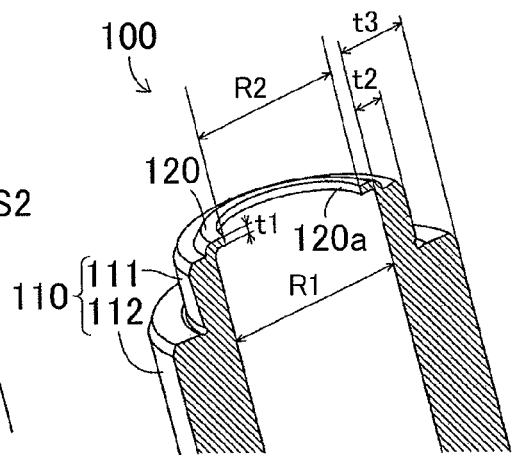
F I G. 3B
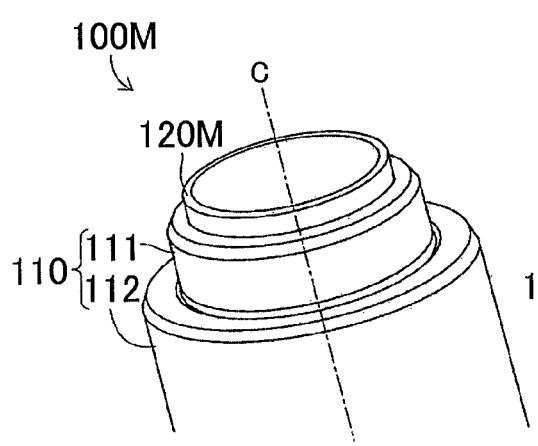
F I G. 4A
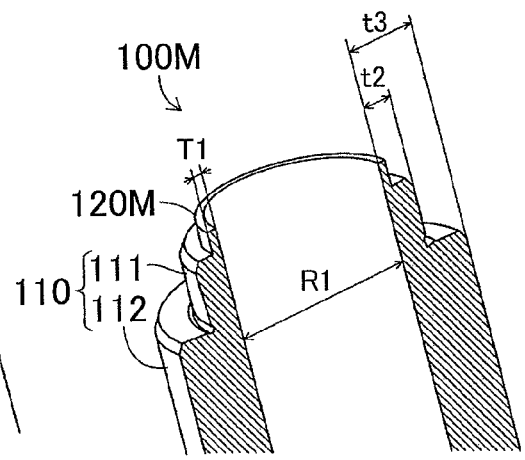
F I G. 4B
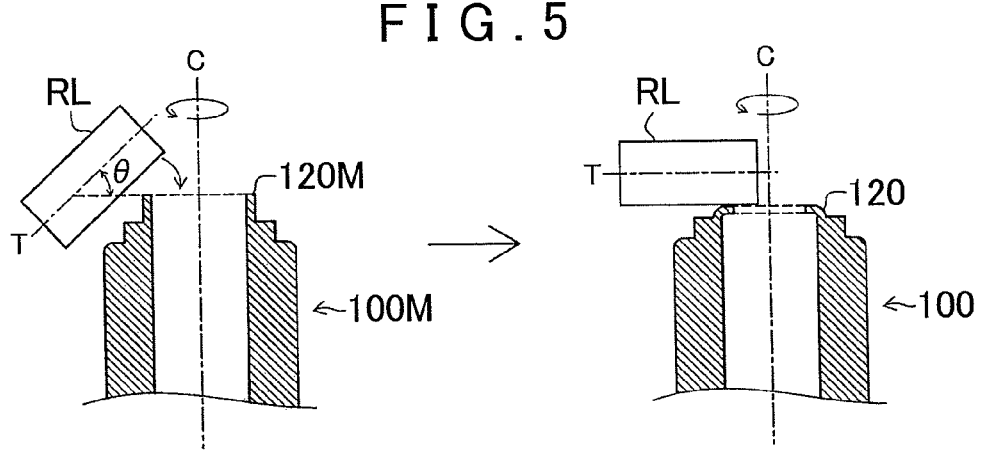
F I G. 5

SHAFT

INCORPORATION BY REFERENCE

The disclosure of Japanese Patent Application No. 2011-041169 filed on Feb. 28, 2011 including the specification, drawings and abstract is incorporated herein by reference in its entirety.

BACKGROUND OF THE INVENTION

The present invention relates to shafts, and more particularly to shafts having therein an oil storage portion for storing oil.

Description of the Related Art

A shaft of a rotor of a rotating electrical machine is known in the art, which is structured to have therein a storage portion in which oil is stored by a centrifugal force during rotation of the rotor (for example, Japanese Patent Application Publication No. JP-A-2003-199292). In this structure, a large inner-diameter portion having a predetermined inner diameter is provided in an oil flow passage formed in the shaft, and small inner-diameter portions having a smaller inner diameter than the large inner-diameter portion are provided at both ends of the large inner-diameter portion. In this structure, oil flowing along the inner peripheral surface of the large inner-diameter portion by the centrifugal force during rotation of the rotating electrical machine is blocked by the small inner-diameter portions provided at both ends of the large inner-diameter portion. Thus, the large inner-diameter portion functions as an oil storage portion that stores the oil. This oil storage portion is provided with a through hole extending from the inner peripheral surface to the outer peripheral surface of the shaft, whereby the oil is supplied from the oil storage portion to the outside of the shaft (for example, a rotor core etc.). This allows a stable amount of oil to be supplied from the oil storage portion in the shaft to the outside of the shaft. The oil supplied to the outside of the shaft is used to cool the components (for example, the rotor core and a stator) of the rotating electrical machine, etc.

SUMMARY OF THE INVENTION

However, in the technique of Japanese Patent Application Publication No. JP-A-2003-199292, the oil storage portion having the larger inner diameter is formed from the side of the end having the smaller inner diameter. For example, this increases the number of cutting processes and the cutting amount for manufacturing the shaft, which may complicate the manufacturing process and may increase the time required for the manufacturing process. Such problems are not problems of only the shafts of the rotating electrical machines, but are problems that are common to the shafts having such an oil storage portion as described above.

A main advantage of the present invention is to provide a technique capable of facilitating manufacturing of shafts having therein an oil storage portion that stores oil.

The present invention was developed to solve at least one of the above problems, and can be implemented as the following forms or aspects.

A shaft according to a first aspect of the present invention includes: an outer peripheral surface; an inner peripheral surface; an oil flow passage that is formed in the shaft and is defined by the inner peripheral surface; a large inner-diameter portion having a first inner diameter; a small inner-diameter portion adjoining the large inner-diameter portion in one direction along an axial direction of the shaft, and having a second inner diameter smaller than the first inner diameter; and a through hole extending from an inner peripheral surface of the large inner-diameter portion to the outer peripheral surface of the shaft, wherein the small inner-diameter portion is formed by bending radially inward an extending portion, which extends in the one direction from the large inner-diameter portion.

According to the shaft having the above configuration, the small inner-diameter portion is formed by bending radially inward the extending portion, which extends in the one direction along the axial direction from the large inner-diameter portion. That is, in this shaft, the large inner-diameter portion and the small inner-diameter portion adjoining the large inner-diameter portion in the one direction can be formed by merely bending the extending portion radially inward after processing the large inner-diameter portion from a side in the one direction. This eliminates the need for a complicated processing process or processing apparatus in order to process the large inner-diameter portion. As a result, the shaft is provided which can be easily produced, and which has the oil flow passage (storage portion) defined by the large inner-diameter portion and the small inner-diameter portion located at an end of the large inner-diameter portion, and thus has an improved capability to supply oil.

According to a second aspect of the present invention, in the shaft according to the first aspect, the extending portion may be a thin portion having a radial thickness smaller than that of the large inner-diameter portion, and the small inner-diameter portion may be formed by bending the thin portion radially inward.

According to the shaft having the above configuration, the small inner-diameter portion is formed by bending radially inward the thin portion, which has the radial thickness smaller than that of the large inner-diameter portion. As a result, the shaft can be provided which can be easily produced, and which has the oil flow passage (storage portion) defined by the large inner-diameter portion and the small inner-diameter portions located at the end of the large inner-diameter portion, and thus has an improved capability to supply oil.

According to a third aspect of the present invention, in the shaft according to the first or second aspect, the extending portion may have at least one cutout formed in an edge of the extending portion.

Thus, the cutout reduces stress in a circumferential direction, which is generated when the inner diameter of the extending portion is reduced by bending the extending portion radially inward. This allows the extending portion to be easily bent. As a result, the shaft can be provided which can be easily produced, and which has the oil flow passage (storage portion) defined by the large inner-diameter portion and the small inner-diameter portion located at the end of the large inner-diameter portion, and thus has an improved capability to supply oil.

According to a fourth aspect of the present invention, the shaft according to the third aspect may further include a support surface that is supported by a bearing on a side of the shaft in the one direction.

According to the shaft having the above configuration, the bearing can be lubricated with the oil flowing out through the cutout in the extending portion.

According to a fifth aspect of the present invention, the shaft according to any one of the first to fourth aspects may further include: a spline forming portion which adjoins the large inner-diameter portion in an opposite direction to the one direction, and has internal spline teeth formed in an inner peripheral surface of the spline forming portion, and to which a external spline teeth forming member having external spline teeth formed in an outer peripheral surface of the forming member is spline coupled.

According to the shaft having the above configuration, the shaft can be provided which has the oil storage portion in which an oil flow is blocked at its end in the one direction by the small inner-diameter portion formed by the bending process, and is blocked at its end in the opposite direction by the spline coupled member. As a result, the shaft can be provided which can be more easily produced, and which has the oil flow passage (storage portion) and thus has an improved capability to supply oil.

Note that the present invention can be implemented in various forms, and for example, can be implemented in forms such as a rotor having the shaft, a rotating electrical machine having the shaft, a power transmission device including the rotating electrical machine having the shaft, and their manufacturing methods.

BRIEF DESCRIPTION OF THE DRAWINGS

FIGS. 3A and 3B show diagrams illustrating the configuration of an end on a first side of the shaft 100;

FIGS. 4A and 4B show diagrams illustrating the configuration of an end on the first side of an intermediate processing member 100M of the shaft 100;

FIG. 5 shows schematic diagrams showing an example of a bending process that is performed on an extending portion 120M of the intermediate processing member 100M;

DETAILED DESCRIPTION OF THE EMBODIMENTS

Figure 1:
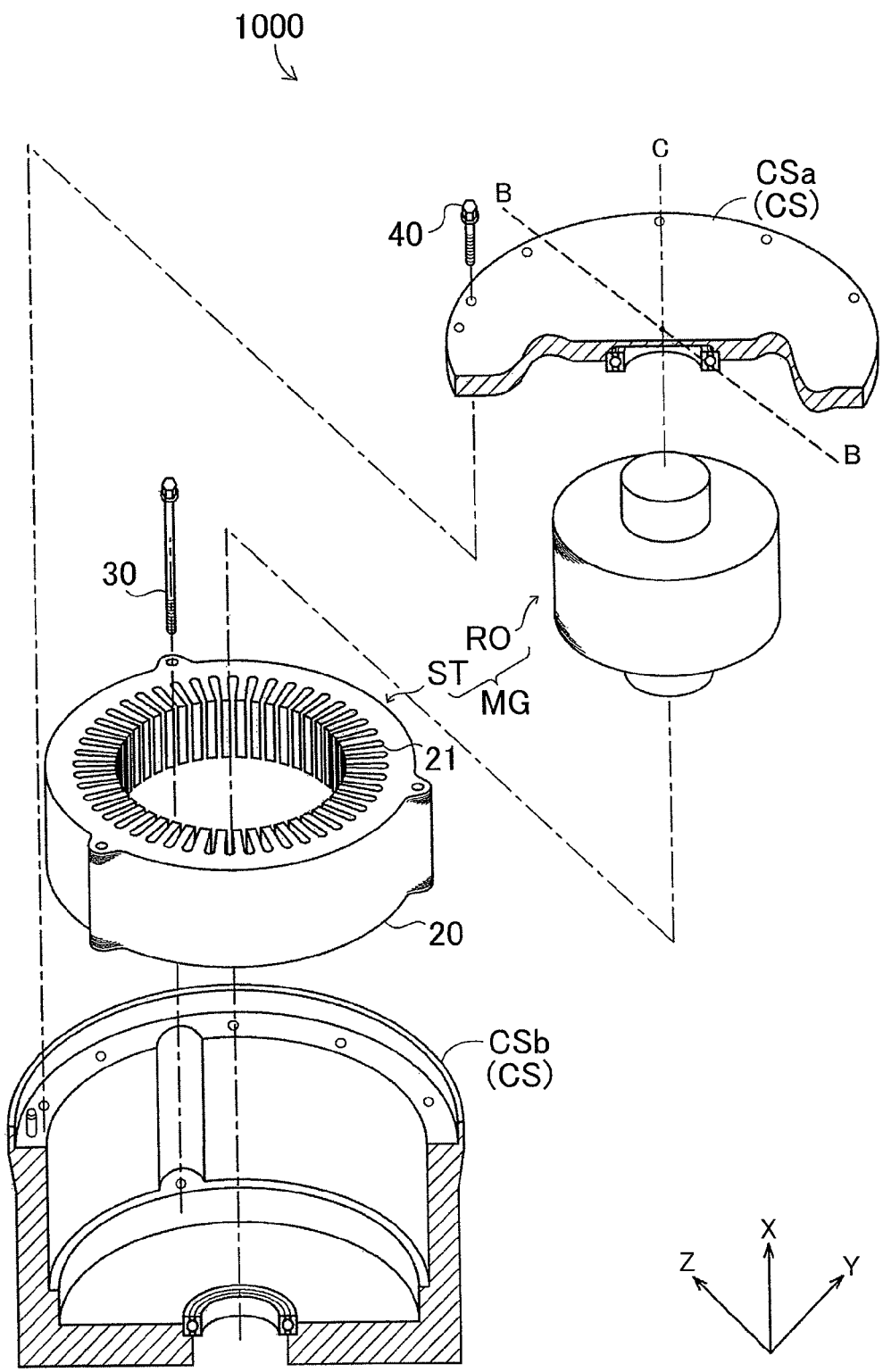
FIG. 1 is a schematic exploded perspective view of a rotating electrical machine unit 1000.
Figure 2:
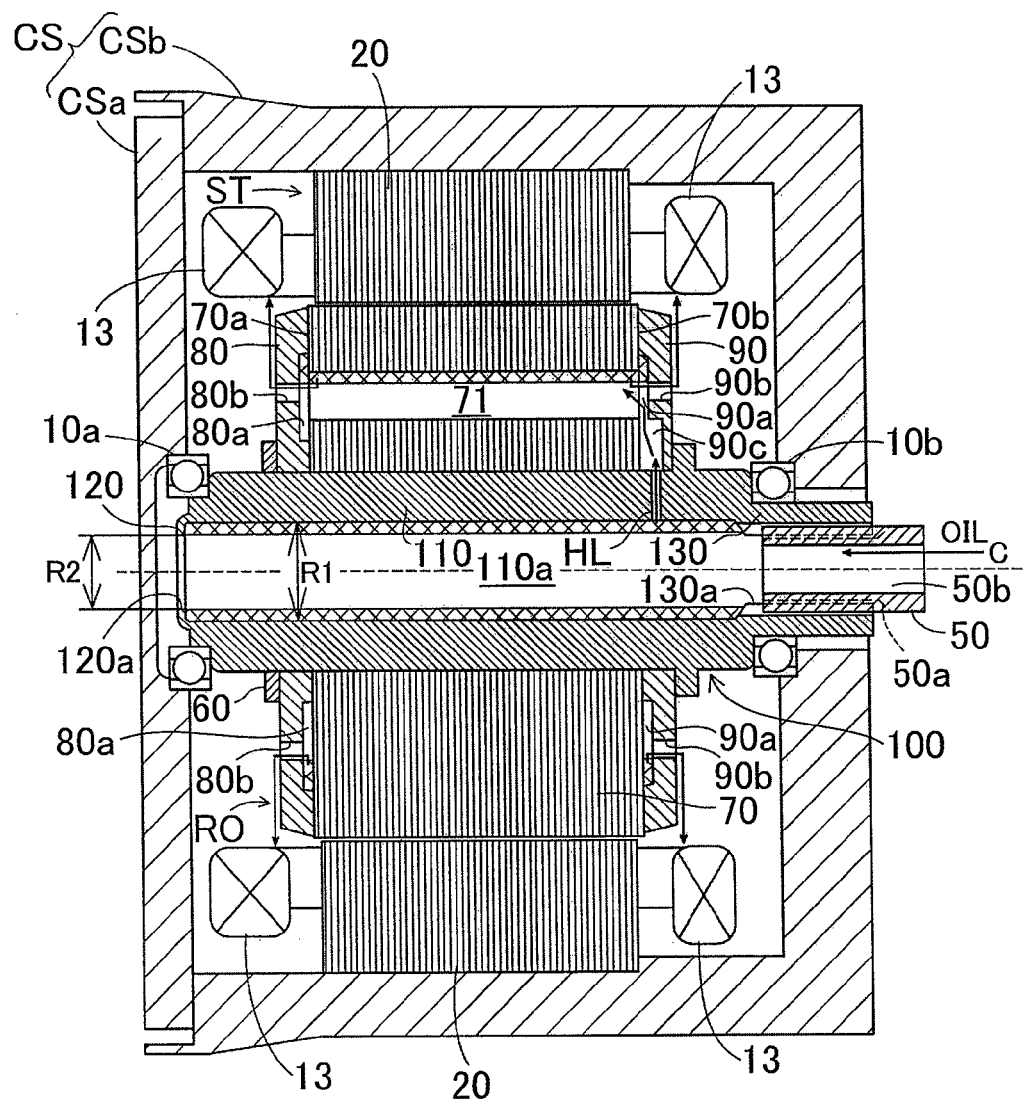
FIG. 2 is a cross-sectional view of the rotating electrical machine unit 1000.
Figure 2:
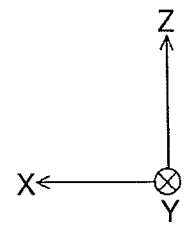

A. Embodiment
A1. Configuration of Rotating Electrical Machine Unit:
FIG. 1 is a schematic exploded perspective view of a rotating electrical machine unit 1000. In FIG. 1, the X direction, the Y direction, and the Z direction are defined as shown in the figure. FIG. 2 is a cross-sectional view of the rotating electrical machine unit 1000. FIG. 2 is a cross-sectional view taken along line B-B in FIG. 1, as viewed in the Y direction.

As shown in FIGS. 1 and 2, the rotating electrical machine unit 1000 includes a rotating electrical machine MG, and a housing case CS including a case lid portion CSa and a case main body portion CSb. The rotating electrical machine MG includes a stator ST and a rotor RO. The rotating electrical machine MG has a function as a motor and a generator.

A central axis C is a central axis of the stator ST, and is also a rotation axis of the rotor RO and a shaft 100 of the rotor RO described later. Hereinafter, the direction (the X-axis direction) along the central axis C is also referred to the "axial direction," and the positive X and negative X directions of the axial direction are also referred to as the "first direction" and the "second direction," respectively. Moreover, the direction extending perpendicularly to the central axis C and away from the central axis C is also referred to as the "radially outward direction." The direction opposite to the radially outward direction, i.e., the direction extending perpendicularly to the axis C and toward the central axis C, is also referred to as the "radially inward direction."

As shown in FIG. 1, with the stator ST being fixed to the case main body portion CSb by s screw 30, and with the rotor RO being placed radially inside the stator ST, the case lid portion CSa is fixed to the case main body portion CSb by s screw 40, whereby the rotating electrical machine unit 1000 is assembled.

A further description will be give below with reference to FIG. 2. The stator ST includes a stator core 20 having a substantially cylindrical shape, and a coil comprised of lead wires wound about the stator core 20. The stator core 20 is formed in the cylindrical shape by staking a plurality of ring-shaped electromagnetic steel plates. The stator core 20 thus formed has a plurality of slot portions 21 (FIG. 1) arranged at a uniform pitch in its inner peripheral portion. The coil is wound about the slot portions 21. FIG. 2 shows coil ends 13 located outside both axial ends of the stator core 20.

The rotor RO includes the shaft 100, a rotor core 70, a first end plate 80, and a second end plate 90. The first end plate 80 is attached to a first end face 70a that is an end face on a first side (a positive X side) of the rotor core 70. The second end plate 90 is attached to a second end face 70b that is an end face on a second side (a negative X side) of the rotor core 70. Each of the rotor core 70, the first end plate 80, and the second end plate 90 has a circular shape having a hole in the center, as viewed in the axial direction. As shown in FIG. 2, the rotor core 70, the first end plate 80, and the second end plate 90 are fitted around the shaft 100, and are fixed to the shaft 100 by a stopper 60.

An end on the first side of the shaft 100 is rotatably supported by the case lid portion CSa via a bearing 10a, and an end on the second side of the shaft 100 is rotatably supported by the case main body portion CSb via a bearing 10b.

The shaft 100 has a large inner-diameter portion 110, a small inner-diameter portion 120 adjoining the large inner-diameter portion 110 in the first direction and located at the end on the first side of the shaft 100, and a spline forming portion 130 adjoining the large inner-diameter portion 110 in the second direction and located at the end on the second side of the shaft 100. The large inner-diameter portion 110 is a portion which has an inner peripheral surface having an inner diameter R1, and in which a cylindrical inside shaft hole 110a is formed so as to extend about the central axis C in the axial direction. The large inner-diameter portion 110 has a through hole HL formed so as to extend therethrough in the radial direction from the inner peripheral surface to the outer peripheral surface thereof. The small inner-diameter portion 120 is a thin portion which has an inner diameter R2 smaller than the inner diameter R1 of the large inner-diameter portion 110, and has an inner peripheral edge 120a about the central axis C like the inside shaft hole 110a of the large inner-diameter portion 110. The spline forming portion 130 is a portion where internal spline teeth 130a are formed in the entire circumference of its inner peripheral surface.

A transmission shaft 50, which is comprised of a separate component from the shaft 100, is fitted in the spline forming portion 130 from the second side. That is, external spline teeth 50a are formed in the entire circumference of the outer peripheral surface of the transmission shaft 50, and are configured to mesh with the internal spline teeth 130a of the spline forming portion 130. The transmission shaft 50 is capable of outputting to the outside a driving force that is generated by the rotating electrical machine MG, when the rotating electrical machine MG functions as the motor. The transmission shaft 50 is also capable of transmitting a driving force from the outside to the rotating electrical machine MG to allow the rotating electrical machine MG to function as the generator.

A inside shaft hole 50b for supplying oil to the inside shaft hole 110a of the large inner-diameter portion 110 is formed in the transmission shaft 50. As shown in FIG. 2, the small inner-diameter portion 120 is placed at the end on the first side of the inside shaft hole 110a of the large inner-diameter portion 110, and the transmission shaft 50 is placed at the end on the second side of the inside shaft hole 110a. If the oil is supplied to the inside shaft hole 110a of the large inner-diameter portion 110 through the inside shaft hole 50b of the transmission shaft 50 during rotation of the rotating electrical machine MG, the oil flows along the inner peripheral surface of the inside shaft hole 110a of the large inner-diameter portion 110. Thus, the oil supplied to the inside shaft hole 110a during rotation of the rotating electrical machine MG is blocked by the small inner-diameter portion 120 on the first side of the inside shaft hole 110a, and is blocked by the transmission shaft 50 on the second side of the inside shaft hole 110a. As a result, the inside shaft hole 110a of the large inner-diameter portion 110 functions as an oil storage portion capable of storing oil along the inner peripheral surface by a centrifugal force, as shown by the cross-hatched area in FIG. 2.

The rotor core 70 is a substantially cylindrical member formed by stacking a plurality of electromagnetic steel plates. Since the rotor core 70 has a well-known structure, detailed description thereof will be omitted. The rotor core 70 has a plurality of permanent magnets inserted in the axial direction near its outer periphery and fixed and held therein, and a plurality of inner core oil passages 71 formed on the radially inner side with respect to the permanent magnets as a plurality of through holes extending through the rotor core 70 in the axial direction.

The first end plate 80 is a substantially disc-like member that is attached to the first end face 70a serving as the end face on the first side of the rotor core 70. Since the first end plate 80 has a well-known structure, detailed description thereof will be omitted. An annular recess is formed between the first end plate 80 and the first end face 70a of the rotor core 70. The annular recess forms a first annular oil passage 80a having an annular shape as viewed in the axial direction. The first annular oil passage 80a communicates with the respective ends on the first side of the plurality of inner core oil passages 71 of the rotor core 70. The first end plate 80 further has a plurality of through holes 80b formed so as to communicate with the first annular oil passage 80a at their one ends, and to open in the face on the first side of the first end plate 80 at the other ends.

The second end plate 90 is a substantially disc-like member that is attached to the second end face 70b as the end face on the second side of the rotor core 70. Like the first end plate 80, an annular recess is formed between the second end plate 90 and the second end face 70b of the rotor core 70. The annular recess forms a second annular oil passage 90a having an annular shape as viewed in the axial direction. The second annular oil passage 90a communicates with the respective ends on the second side of the plurality of inner core oil passages 71 of the rotor core 70. The second end plate 90 further has a plurality of through holes 90b formed so as to communicate with the second annular oil passage 90a at their one ends, and to open in the face on the second side of the second end plate 90 at the other ends. Furthermore, a groove is formed between the second end plate 90 and the second end face 70b of the rotor core 70 so as to form a supply oil passage 90c extending in the radial direction. The supply oil passage 90c communicates at its radially inner end with the through hole HL formed in the shaft 100, and communicates at its radially outer end with the second annular oil passage 90a.

A mechanism for cooling the rotating electrical machine MG having the above schematic structure will be described below. As described above, oil is stored inside the shaft 100 by a centrifugal force during rotation of the rotating electrical machine MG. The stored oil is supplied by the centrifugal force to the inner core oil passages 71 of the rotor core 70 through the through hole HL of the shaft 100, the supply oil passage 90c of the second end plate 90, and the second annular oil passage 90a of the second end plate 90, as shown by arrows in FIG. 2. The oil supplied to the inner core oil passages 71 is supplied by the centrifugal force to the coil ends 13 through the through holes 80b of the first end plate 80 and the through holes 90b of the second end plate 90, as shown by arrows in FIG. 2. The rotor core 70 and the coil of the stator ST are cooled by such an oil flow.

A2. Configuration of End of Shaft 100 and Processing Method

The configuration of the end on the first side of the shaft 100 described above, and a processing method thereof will be further described below. FIGS. 3A and 3B show diagrams illustrating the configuration of the end on the first side of the shaft 100. FIG. 3A is a perspective view of the end on the first side of the shaft 100. FIG. 3B is a diagram of a cut model of the shaft 100 cut along a plane passing through the central axis C, as viewed from the same angle as FIG. 3A.

The large inner-diameter portion 110 of the shaft 100 has a central portion 112 around which the rotor core 70 described above, and the like is fitted, and a support portion 111 located on the first side of the central portion 112 and having a small outer diameter. Since the central portion 112 and the support portion 111 have the same inner diameter (R2), the radial thickness t2 of the support portion 111 is smaller than the radial thickness t3 of the central portion 112. The support portion 111 is a portion that is formed to be supported by the bearing 10a (FIG. 2) attached to the case lid portion CSa described above. That is, an outer peripheral surface Si of the support portion 111 and an end face S2 on the first side of the central portion 112 serve as a support surface that is supported by the bearing 10a.

The small inner-diameter portion 120 located on the first side of the support portion 111 has a ring shape having an axial thickness t1. The inner diameter R2 of the inner peripheral edge 120a of this ring shape is smaller than the inner diameter R1 of the large inner-diameter portion 110, and the outer diameter of the outer peripheral edge of this ring shape is slightly larger than the inner diameter R2. The axial thickness t1 of the small inner-diameter portion 120 is still smaller than the thickness t2 of the support portion 111 described above (t1<t2<t3). Note that the small inner-diameter portion 120 may have any thickness that allows the small inner-diameter portion 120 to be formed by a bending process as described below. For example, the thickness of the small inner-diameter portion 120 may be about the same as the thickness t2 of the support portion 111 if the small inner-diameter portion 120 can be formed by the bending process. The outer peripheral edge of the ring shape of the small inner-diameter portion 120 connects to an inner peripheral edge of the end face on the first side of the large inner-diameter portion 110 Thus, the small inner-diameter portion 120 is placed on the outer side (on the first side) with respect to the support portion 111 that is supported by the bearing 10a.

FIGS. 4A and 4B show diagrams illustrating the configuration of the end on the first side of an intermediate processing member 100M of the shaft 100. FIG. 4A is a perspective view of the end of the intermediate processing member 100M. FIG. 4B is a diagram of a cut model of the intermediate processing member 100M cut along a plane passing through the central axis C, as viewed from the same angle as FIG. 4A.

When fabricating the shaft 100, the intermediate processing member 100M shown in FIG. 4B is first prepared. The intermediate processing member 100M has an extending portion 120M formed to extend in the first direction from a position near the inner periphery of the support portion 111 of the large inner-diameter portion 110 described above. The extending portion 120M has a cylindrical shape having the same inner diameter R2 as the large inner-diameter portion 110 (the support portion 111 and the central portion 112) and having a radial thickness T1. The radial thickness T1 of the extending portion 120M is smaller than the thickness t2 of the support portion 111, and is approximately the same as the axial thickness t1 (FIG. 3B) of the smaller inner-diameter portion 120 described above. The radial thickness T1 may be varied by the bending process described below. Therefore, the radial thickness T1 of the extending portion 120M and the axial thickness t1 of the smaller inner-diameter portion 120 are denoted by the different reference characters.

The intermediate processing member 100M is comprised of a predetermined metal such as carbon steel. After roughly molded into its outer shape by casting, the intermediate processing member 100 is finished by cutting work. Since the extending portion 120M and the large inner-diameter portion 110 have the same inner diameter, the respective holes inside the extending portion 120M and the large inner-diameter portion 110 can be foamed from the first side by a turning process using a commonly used boring tool, without using a special cutting tool. Moreover, the cutting amount can be reduced as compared to the case of cutting into a shape having a plurality of portions with different inner diameters, and especially into a shape in which a portion having a smaller inner diameter is located on an outer side.

Next, the extending portion 120M of the intermediate processing portion 100M is bent radially inward by the bending process to form the small inner-diameter portion 120 in the extending portion 120M. FIG. 5 shows schematic diagrams showing an example of the bending process that is performed on the extending portion 120M of the intermediate processing member 100M.

As shown in FIG. 5, the intermediate processing member 100M is fixed to a lathe or the like and is rotated about the central axis C of the intermediate processing member 100M. While the intermediate processing member 100M is being rotated, the side surface of a cylindrical roller RL having an axis T as its central axis is pressed against the end on the first side (upper side in FIG. 5) of the extending portion 120M. For example, the side surface of the roller RL is tilted so as to form a predetermined angle θ with a plane perpendicular to the central axis C, and in this state, is pressed radially inward (leftward in FIG. 5) against the end of the extending portion 120M. As the bending process of bending the extending portion 120M radially inward progresses, the angle θ of the roller RL is gradually reduced, and the roller RL is pivoted until the side surface of the roller RL finally extends perpendicularly to the central axis C (the right side in FIG. 5). The extending portion 120M is thus processed into the small inner-diameter portion 120. This bending process is by way of example only, and the small inner-diameter portion 120 may be formed by other processing methods, such as press working in which the extending portion 120M is pressed from the first side (upper side in FIG. 5) into the second side (lower side in FIG. 5) by a metal mold.

In the shaft 100 of the rotating electrical machine MG described above, the small inner-diameter portion 120 is formed by bending radially inward the extending portion 120M, which extends in the first direction from the large inner-diameter portion 110. That is, in this shaft 100, the large inner-diameter portion 110 and the small inner-diameter portion 120 adjoining the large inner-diameter portion 110 in the first direction can be formed by merely bending the extending portion 120M radially inward after processing the large inner-diameter portion 110 from the first side. This eliminates the need for a complicated processing process or processing apparatus in order to process the large inner-diameter portion 110. As a result, the shaft 100 is provided which can be easily produced, and which has the oil storage portion defined by the large inner-diameter portion 110 and the small inner-diameter portion 120 and thus has an improved capability to supply oil.

The radial thickness T1 of the extending portion 120M of the intermediate processing member 100M of the shaft 100 is smaller than the radial thicknesses (t2 and t3) of the larger inner-diameter portion 110. This allows the extending portion 120M to be easily formed into the small inner-diameter portion 120 by the bending process.

Since the small inner-diameter portion 120 is placed on the outer side (on the first side) with respect to the support portion 111 that is supported by the bearing 10a, the small inner-diameter portion 120 need not be rigid enough to be supported by the bearing 10a. Thus, the small inner-diameter portion 120 can be designed to have the thickness t1 that is small enough to allow the small inner-diameter portion 120 to be easily formed by the bending process. Moreover, since the small inner-diameter portion 120 having a small thickness is formed in the endmost part of the shaft 100, the size of the oil storage portion formed inside the shaft 100 can be increased without excessively increasing the length of the shaft 100.

B. Modifications

Note that the components in the above embodiment, components other than those described in the independent claim are additional components, and can be omitted as appropriate. The present invention is not limited to the above example or embodiment, and can be carried out in various forms without departing from the sprit and scope of the present invention. For example, the present invention can be modified as follows.

The small inner-diameter portion of the shaft need only be formed by bending the extending portion extending in the first direction from the large inner-diameter portion. The small inner-diameter portion is not limited to the shape shown in the above embodiment, and may have various shapes. Examples of other shapes will be described below as first to third modifications.

Figure 6A:
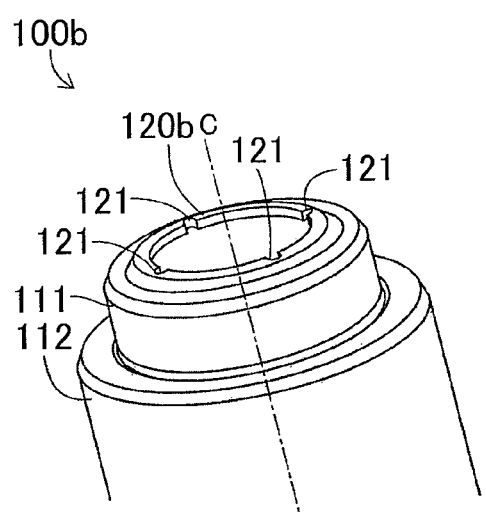
FIGS. 6A and 6B show diagrams illustrating the configuration of an end on the first side of a shaft 100b in a first modification.
Figure 6B:
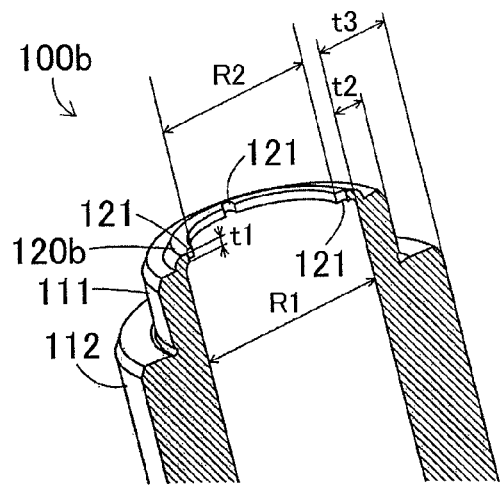
Figure 7A:
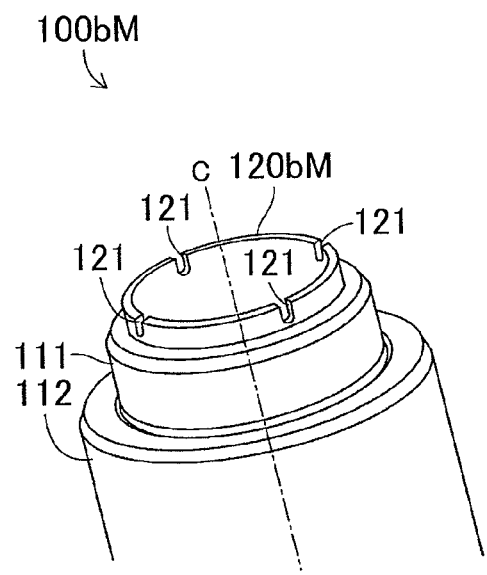
FIGS. 7A and 7B show diagrams illustrating the configuration of an end on the first side of an intermediate processing member 100bM of the shaft 100b in the first modification.
Figure 7B:
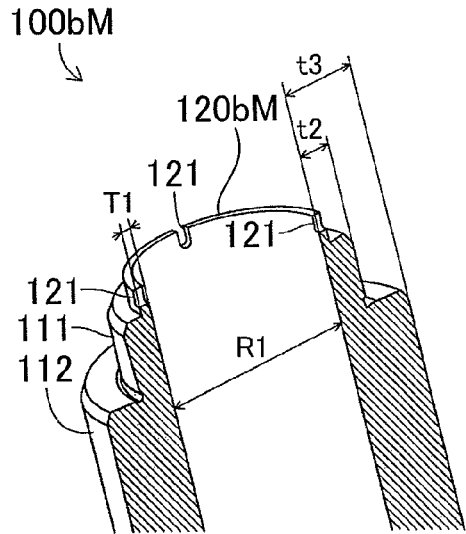

B1. First Modification:

FIGS. 6A and 6B show diagrams illustrating the configuration of the end on the first side of a shaft 100b in a first modification. FIGS. 7A and 7B show diagrams illustrating the configuration of the end of an intermediate processing member 100bM of the shaft 100b on first side in the first modification.

The shaft 100b in the first modification is different from the shaft 100 in the embodiment in that cutouts 121 are formed in the inner peripheral edge of a small inner-diameter portion 120b of the shaft 100b in the first modification. As shown in FIG. 6A, four cutouts 121 are provided in the inner peripheral edge of the small inner-diameter portion 120b so as to be distributed in the circumferential direction.

As shown in FIGS. 7A and 7B, these cutouts 121 are formed in an extending portion 120bM of an intermediate processing member 100bM before the small inner-diameter portion 120b is formed by a bending process. The extending portion 120bM having the cutouts 121 formed therein is formed into the small inner-diameter portion 120b by a bending process similar to that of the embodiment.

The configuration of the shaft 100b in the first modification is otherwise the same as to that of the shaft 100 in the embodiment. Thus, in FIGS. 6 and 7, the same configuration is denoted by the same reference characters as those of the embodiment, and description thereof will be omitted.

According to the shaft 100b of the first modification, the cutouts 121 reduce the stress in the circumferential direction, which is generated when the inner diameter of the extending portion 120bM is reduced by bending the extending portion 120bM radially inward. This allows the extending portion 120bM to be easily bent. Accordingly, processing can be more easily performed as compared to the shaft 100 of the embodiment.

Moreover, using the shaft 100b in such a rotating electrical machine as shown in FIG. 2 allows the oil to be supplied from the oil storage portion in the shaft 100b via the cutouts 121 to the bearing 10a supporting the first side of the shaft 100b. As a result, the bearing 10a can be lubricated. By adjusting the size and the number of cutouts 121, the oil stored in the oil storage portion in the shaft 100b can be divided into the part that flows out through the through hole HL to cool the rotating electrical machine MG, and the part that flows out through the cutouts 121 to lubricate the bearing 10a, at an appropriate ratio.

Figure 8A:
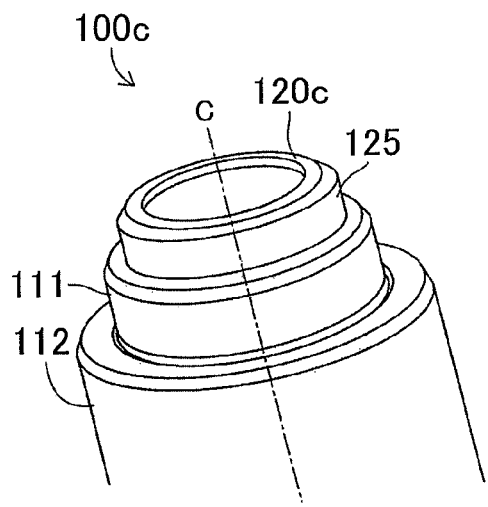
FIGS. 8A and 8B show diagrams illustrating the configuration of an end on the first side of a shaft 100c in a second modification.
Figure 8B:
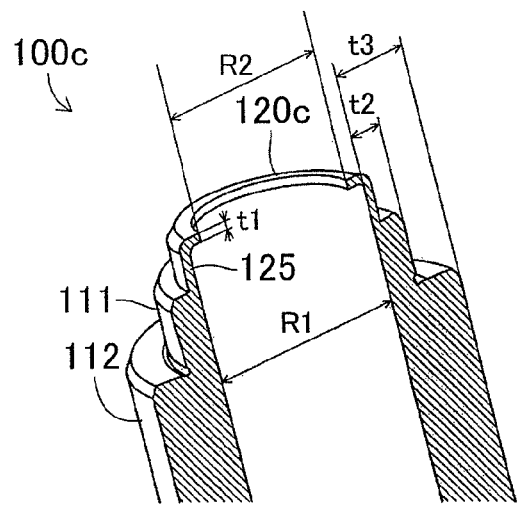

B2. Second Modification:

FIGS. 8A and 8B show diagrams illustrating the configuration of the end on the first side of a shaft 100c in a second modification. The shaft 100c in the second modification is different from the shaft 100 in the embodiment in that a thin large inner-diameter portion 125 is provided between the small inner-diameter portion 120c and the support portion 111 of the shaft 100c in the second modification.

Although not shown in the figure, an extending portion of an intermediate processing member in the second modification is made longer in the axial direction than the extending portion 120M (FIG. 4B) of the intermediate processing member 100M in the embodiment. A part on the first side of the extending portion of the intermediate processing member is bent to form a small inner-diameter portion 120c. The remaining part (the part on the second side) of the extending portion of the intermediate processing member is not bent, and serves as the thin large inner-diameter portion 125.

As in this modification, it is not necessarily required to process the entire extending portion into the small inner-diameter portion, and at least a part of the extending portion need be processed into the small inner-diameter portion.

Figure 9A:
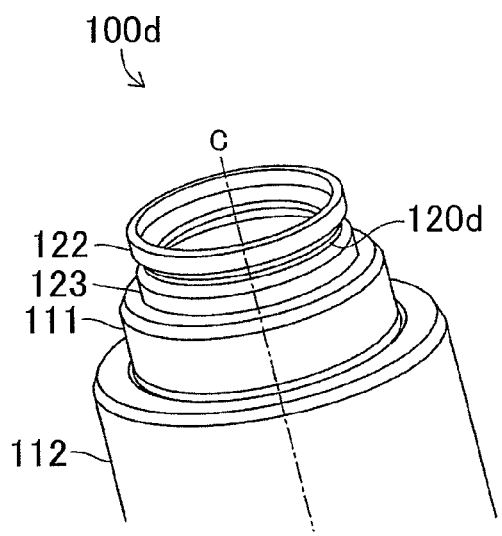
FIGS. 9A and 9B show diagrams illustrating the configuration of an end on the first side of a shaft 100d in a third modification.
Figure 9B:
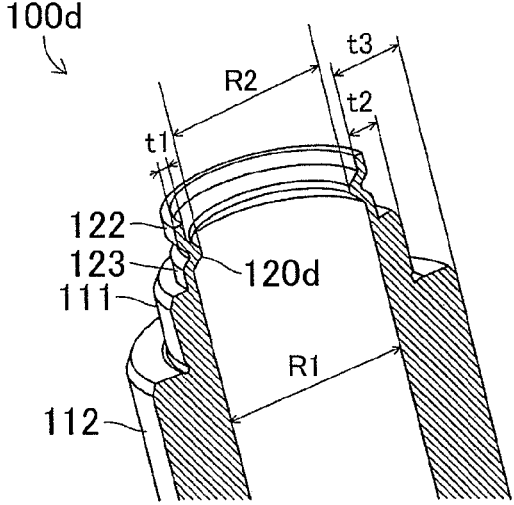

B3. Third Modification:

FIGS. 9A and 9B show diagrams illustrating the configuration of the end on the first side of a shaft 100d in a third modification. The shaft 100d in the third modification is different from the shaft 100 in the embodiment in that a small inner-diameter portion in the third modification is a recessed portion 120d provided between an inner thin large inner-diameter portion 123 adjoining the support portion 111 in the first direction and an outer thin large inner-diameter portion 122 located in the endmost part on the first side of the shaft 100d. The recessed portion 120d has a convex shape that recesses radially inward as shown in FIG. 9B, as viewed in a cross section taken along a plane passing through the central axis C.

Although not shown in the figure, an extending portion of an intermediate processing member in the third modification is made longer in the axial direction than the extending portion 120M (FIG. 4B) of the intermediate processing member 100M in the embodiment. Of the extending portion of the intermediate processing member, an intermediate part interposed between the outer thin large inner-diameter portion 122 and the inner thin large inner-diameter portion 123 is bent radially inward so as to form the recessed portion 120d described above, and is thus formed into the small inner-diameter portion.

B4. Fourth Modification:

In the above embodiment, the small inner-diameter portion 120 is formed by bending the extending portion 120M to 90 degrees with respect to the central axis C, as shown in FIG. 5. However, the present invention is not limited to this. The extending portion 120M need only be bent until the small inner-diameter portion 120 having an inner diameter that is large enough to allow a predetermined amount of oil to be stored in the oil storage portion is formed, and may be bent to an angle (for example, 60 degrees or 70 degrees) less than 90 degrees.

B5. Fifth Modification:

In the embodiment, the present invention is applied to the shaft 100 of the rotating electrical machine MG. However, the present invention is not limited to shafts of rotating electrical machines or shafts that are supported by a bearing, and is applicable to any shaft having an oil storage portion therein. The end on the second side of the shaft 100 need not necessarily be made to have a smaller inner diameter by spline coupling, and may be formed by a bending process, like the end on the first side of the shaft 100. Specifically, an extending portion extending in the second direction from the large inner-diameter portion 110 may be provided on the second side of the large inner-diameter portion 110 of the shaft 100, and a small inner-diameter portion may be formed by bending the extending portion radially inward.

This allows both of the small inner-diameter portions located at both ends of the shaft to be easily formed by the bending process. As a result, the shaft can be provided which can be easily produced, and which has the oil flow passage (storage portion) defined by the large inner-diameter portion and the small inner-diameter portions located at the ends of the large inner-diameter portion, and thus has an improved capability to supply oil.

B6. Sixth Modification:

The rotating electrical machines MG of the embodiment and the modifications are preferable as motors and/or generators of electric cars or hybrid vehicles. However, the present invention is not limited to this, and is applicable to motors and/or generators of various machines and movable bodies.

The present invention can be used in a preferable manner in shafts having an outer peripheral surface and an inner peripheral surface, and having formed therein an oil flow passage that is defined by the inner peripheral surface.

What is claimed is:

1. A shaft, comprising:
   an outer peripheral surface;
   an inner peripheral surface;
   an oil flow passage that is formed in the shaft and is defined by the inner peripheral surface;
   a large inner-diameter portion having a first inner diameter;
   a small inner-diameter portion adjoining the large inner-diameter portion in one direction along an axial direction of the shaft, and having a second inner diameter smaller than the first inner diameter; and a through hole extending from an inner peripheral surface of the large inner-diameter portion to the outer peripheral surface of the shaft, wherein the small inner-diameter portion is formed by bending radially inward an extending portion, which extends in the one direction from the large inner-diameter portion, the extending portion is a thin portion having a radial thickness smaller than that of the large inner-diameter portion, and the small inner-diameter portion is formed by bending the thin portion radially inward.

2. The shaft according to claim 1, wherein the extending portion has at least one cutout formed in an edge of the extending portion.

3. The shaft according to claim 2, further comprising: a support surface that is supported by a bearing on a side of the shaft in the one direction.

4. The shaft according to claim 3, further comprising: a spline forming portion which adjoins the large inner-diameter portion in an opposite direction to the one direction, and has internal spline teeth formed in an inner peripheral surface of the spline forming portion, and to which a external spline teeth forming member having external spline teeth formed in an outer peripheral surface of the forming member is spline coupled.

5. The shaft according to claim 2, further comprising: a spline forming portion which adjoins the large inner-diameter portion in an opposite direction to the one direction, and has internal spline teeth formed in an inner peripheral surface of the spline forming portion, and to which a external spline teeth forming member having external spline teeth formed in an outer peripheral surface of the forming member is spline coupled.

6. The shaft according to claim 1, further comprising: a spline forming portion which adjoins the large inner-diameter portion in an opposite direction to the one direction, and has internal spline teeth formed in an inner peripheral surface of the spline forming portion, and to which a external spline teeth forming member having external spline teeth formed in an outer peripheral surface of the forming member is spline coupled.

* * * * *